(12) United States Patent
Manes et al.

(10) Patent No.: US 7,305,687 B1
(45) Date of Patent: Dec. 4, 2007

(54) APPARATUS FOR SUPPORTING A STORAGE CONTAINER

(75) Inventors: Joseph Paul Manes, Arvada, CO (US); Daniel J. Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 459 days.

(21) Appl. No.: 10/834,435

(22) Filed: Apr. 29, 2004

(51) Int. Cl.
*G11B 33/04* (2006.01)
*A47B 81/06* (2006.01)
*G11B 17/22* (2006.01)

(52) U.S. Cl. .................. 720/647; 720/653; 360/92; 312/9.42; 312/9.44

(58) Field of Classification Search .............. 720/646, 720/647, 653, 654, 655; 360/92; 312/9.41–9.44, 312/8.15
See application file for complete search history.

(56) References Cited

U.S. PATENT DOCUMENTS

| | | | |
|---|---|---|---|
| 1,262,789 A * | 4/1918 | Heller ........................ 312/9.43 |
| 4,285,557 A * | 8/1981 | Paladino et al. ............ 312/246 |
| 4,859,007 A * | 8/1989 | Schapker .................... 312/9.54 |
| 5,069,236 A * | 12/1991 | Pierson ....................... 134/153 |
| 5,231,552 A * | 7/1993 | Schneider et al. ............ 360/92 |
| 5,337,297 A * | 8/1994 | Kvifte et al. ............. 369/30.47 |
| 5,393,137 A * | 2/1995 | Bivens et al. ................ 312/332 |
| 5,402,285 A * | 3/1995 | Theobald et al. ............. 360/69 |
| 5,586,003 A * | 12/1996 | Schmitt et al. ............. 361/683 |
| 5,755,497 A * | 5/1998 | Chang ....................... 312/223.2 |
| 6,126,257 A * | 10/2000 | Carpenter et al. .......... 312/9.44 |
| 6,158,942 A | 12/2000 | Apple et al. |
| 6,234,595 B1 * | 5/2001 | Maple et al. ................ 312/323 |
| 6,253,568 B1 * | 7/2001 | Peffley ......................... 62/441 |
| 6,332,656 B1 * | 12/2001 | Gaves ........................ 312/9.14 |
| 6,614,619 B1 * | 9/2003 | Satoh .......................... 360/92 |
| 6,648,428 B2 * | 11/2003 | Chaloner et al. ........... 312/9.43 |
| 6,700,734 B2 * | 3/2004 | Satoh .......................... 360/92 |
| 7,061,767 B2 * | 6/2006 | Schmidtke et al. .......... 361/724 |
| 2002/0122271 A1 * | 9/2002 | Coffin et al. .................. 360/92 |
| 2002/0153815 A1 * | 10/2002 | Chaloner et al. ............ 312/333 |
| 2003/0039181 A1 * | 2/2003 | Coffin et al. ............. 369/30.48 |
| 2005/0230410 A1 * | 10/2005 | DeLazzer et al. .............. 221/92 |

FOREIGN PATENT DOCUMENTS

| | | | |
|---|---|---|---|
| GB | 2034528 A | * | 6/1980 |
| GB | 2203028 A | * | 10/1988 |
| JP | 09091836 A | * | 4/1997 |
| JP | 11185350 A | * | 7/1999 |
| JP | 11288544 A | * | 10/1999 |
| JP | 2002206500 A | * | 7/2002 |
| KR | 392404 B | * | 7/2003 |

* cited by examiner

*Primary Examiner*—William J Klimowicz
(74) *Attorney, Agent, or Firm*—Brooks Kushman P.C.

(57) ABSTRACT

An apparatus for supporting a storage container upon removal from a storage compartment. A door is disposed proximate the storage compartment and is movable between an open position and a closed position. The door includes a mating feature. The storage container includes a retention feature. The mating feature is configured to engage the retention feature and support the storage container when the door is in the open position and the storage container is removed from the storage compartment.

20 Claims, 4 Drawing Sheets

APPARATUS FOR SUPPORTING A STORAGE CONTAINER

BACKGROUND OF THE INVENTION

1. Field of the Invention

The present invention relates to an apparatus for supporting a storage container upon removal from a storage compartment, and more particularly to an apparatus that supports a storage container on a door disposed proximate the storage compartment.

2. Background Art

Storage containers, such as media storage magazines, are used to hold data storage media, such as tape cartridges. These magazines are placed in a data storage library to facilitate recording and retrieval of data. Previously, magazines needed to be completely removed from the data storage library to permit loading and unloading of the tape cartridges. More specifically, magazines were removed from the data storage library and transported to another location where tapes were loaded and/or unloaded. The transportation and handling of magazines was time consuming and increased the amount of time that all tapes in the magazine were unavailable for use.

SUMMARY OF THE INVENTION

According to one aspect of the present invention, an apparatus for supporting a storage container upon removal from a storage compartment is provided. The apparatus includes a door disposed proximate the storage compartment that is movable between an open position and a closed position. The storage container includes a retention feature. The door includes a mating feature that is configured to engage the retention feature to support the storage container when the door is in the open position and the storage container is removed from the storage compartment.

The apparatus may include a second door configured to close behind the storage container when the storage container is removed from the storage compartment. The apparatus may include a spring configured to bias the storage container against an interior surface of the storage compartment when the door is in the closed position.

The retention and mating features may be disposed in a plane when the door is in the open position. The retention feature may comprise a protrusion that extends along an exterior surface of the storage container. The mating feature may comprise a groove that extends along the door.

The storage compartment may include a guide adapted to receive the retention feature when the storage container is disposed in the storage compartment. The guide may be coplanar with the mating feature when the door is in the open position.

According to another aspect of the present invention, a data storage library for use with a storage magazine is provided. The data storage library includes a housing and a door. The housing defines a storage compartment for receiving the storage magazine. The door is associated with the housing and is movable between a closed position and an open position. The door includes a mating feature that is engageable with the storage magazine and configured to support the storage magazine when the door is in the open position and the storage magazine is removed from the storage compartment.

The housing may include first and second panels disposed proximate the storage compartment. The first and second panels may include first and second guides, respectively.

The door may have first and second mating features that are coextensive with the first and second guides when the door is in the open position.

The first and second panels may include first and second extension arms that extend from the data storage library. The first and second extension arms may be configured to extend the first and second guides proximate the first and second mating features when the door is in the open position. The first and second extension arms may be integrally formed with the first and second panels.

According to another aspect of the present invention, a data storage system is provided. The data storage system includes a media storage magazine and a data storage library. The media storage magazine includes a media port, a top surface, a bottom surface, a top retention feature extending from the top surface, and a bottom retention feature extending from the bottom surface. The data storage library includes a housing having a storage compartment configured to receive the media storage magazine. The library further includes a door associated with the housing and movable between an open position and a closed position in which the door at least partially covers the storage compartment. The door includes upper and lower mating features that are engageable with the top and bottom retention features when the door is in the open position. The media storage magazine is positionable on the door to permit access to the media port when the door is in the open position.

The top and bottom retention features may be adapted to slide along the upper and lower mating features when the door is in the open position. The top and bottom retention features and the upper and lower mating features may be coplanar.

A retention spring may be disposed between the upper and lower mating features for holding the media storage magazine stationary when the door is closed.

The door may be pivotally attached to the data storage library. A second door may be disposed in the storage compartment and at least partially conceal a storage compartment opening when the media storage magazine is removed from the storage compartment.

DETAILED DESCRIPTION OF THE PREFERRED EMBODIMENT(S)

Figure 1:
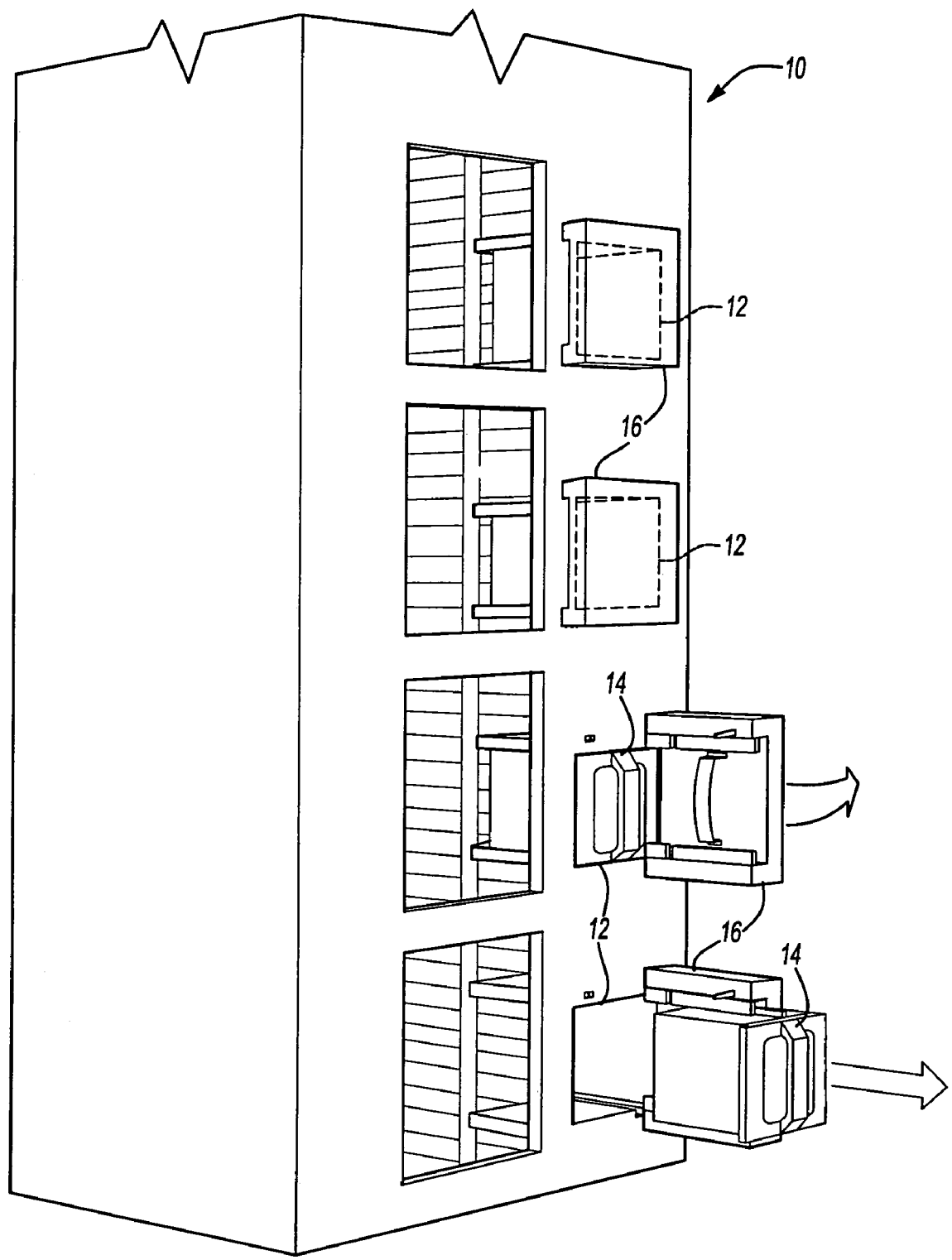
FIG. 1 is a perspective view of a data storage library having a plurality of storage compartments.

Referring to FIG. 1, a storage cabinet or media storage library 10 is shown. The storage library 10 may be used to store and facilitate access to any suitable type of data storage media, such as tapes, optical discs, compact discs, and digital video discs (DVD). The storage library 10 may include equipment for handling the storage media, such as a robot, and for accessing data stored on the storage media.

The storage library 10 may also include a vision system and system management and/or diagnostic equipment.

The storage library 10 includes one or more access ports or storage compartments 12. Each storage compartment 12 is adapted to receive a storage container 14.

Figure 2:
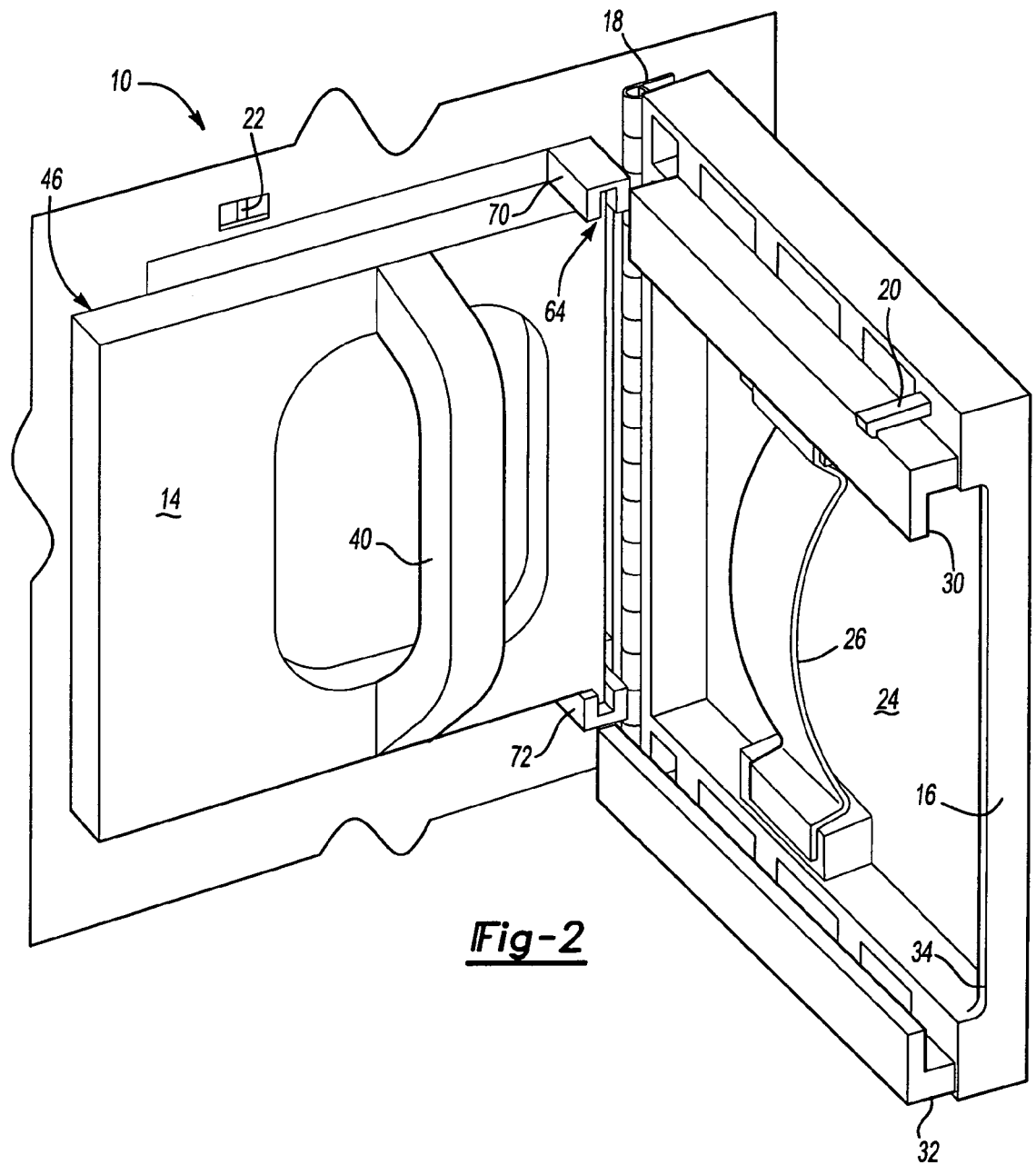
FIG. 2 is a perspective view of a portion of the data storage library having a storage container inserted in a storage compartment.

Referring to FIG. 2, a portion of the storage library 10 having a storage compartment 12 is shown in more detail. An outer door 16 is positioned proximate the storage compartment 12. The door 16 may have any suitable configuration and may be made of any suitable material, such as a polymeric material or metal like aluminum.

The door 16 is configured to move between a closed position and an open position. The storage compartment 12 is covered when the door 16 is in the closed position. The storage compartment 12 is uncovered when the door 16 is in the open position. In one embodiment, the door 16 is in the open position when disposed approximately perpendicular to the storage library 10. However, the door 16 may be positioned at any suitable angle relative to the storage library 10 to define the open position.

The door 16 may be movably connected to the storage library 10 in any suitable manner. For example, the door 16 may be connected to the storage library 10 by a hinge 18. Alternatively, the door 16 may be connected to the storage library 10 with one or more pivot pins.

The door 16 may include a strike 20 configured to engage a latch 22 disposed on the storage library 10. The strike 20 and latch 22 are adapted to hold the door 16 in the closed position. In one embodiment, the strike 20 protrudes from an inner surface 24 of the door 16. The strike 20 and latch 22 may have any suitable configuration and be disposed in any suitable position. For example, the latch 22 may be positioned adjacent to or inside the storage compartment 12. In addition, the latch 22 may be configured to release the strike 20 when a release lever or button is actuated.

The door 16 may include one or more springs 26 configured to contact the storage container 14. The spring 26 may be used to hold the storage container 14 stationary and/or "square up" the storage container 14 against one or more stops or datum surfaces when the door 16 in the closed position. The spring 26 may have any suitable configuration. For example, the spring 26 may be integrally formed with the door 16. Alternatively, the spring 26 may be a separate component that is attached to the door 16 in any suitable manner, such as with one or more fasteners or retention tabs. The spring 26 may be made of any suitable material, such as spring steel.

The door 16 may also include one or more mating features adapted to receive the storage container 14, as will be described in detail below. In one embodiment, the door 16 includes a first mating feature 30 and a second mating feature 32. The mating features 30,32 may be made of any suitable material and have any suitable configuration. For example, the mating features 30,32 may have a male configuration, a female configuration, or any combination thereof. In the embodiment shown, the mating features 30,32 have a female configuration. More specifically, the first and second mating features 30,32 are configured as parallel grooves disposed on the inner surface 24 of the door 16. The mating features 30,32 may have similar geometries, lengths, and may be disposed in a common plane. Alternatively, the mating features may have different geometries, lengths, and/or may be disposed in different planes. Moreover, the door 16 may be configured such that first and second mating features 30,32 are disposed in or adjacent to the storage compartment 12 when the door 16 is in the closed position.

The mating features 30,32 may be integrally formed with the door 16. Alternatively, the mating features 30,32 may be separate components that are attached to the door 16 in any suitable manner, such as by welding, fasteners, and/or adhesives.

Optionally, the door 16 may include a recess 34 configured to provide clearance for removing the storage container 14 from the door 16.

Figure 3:
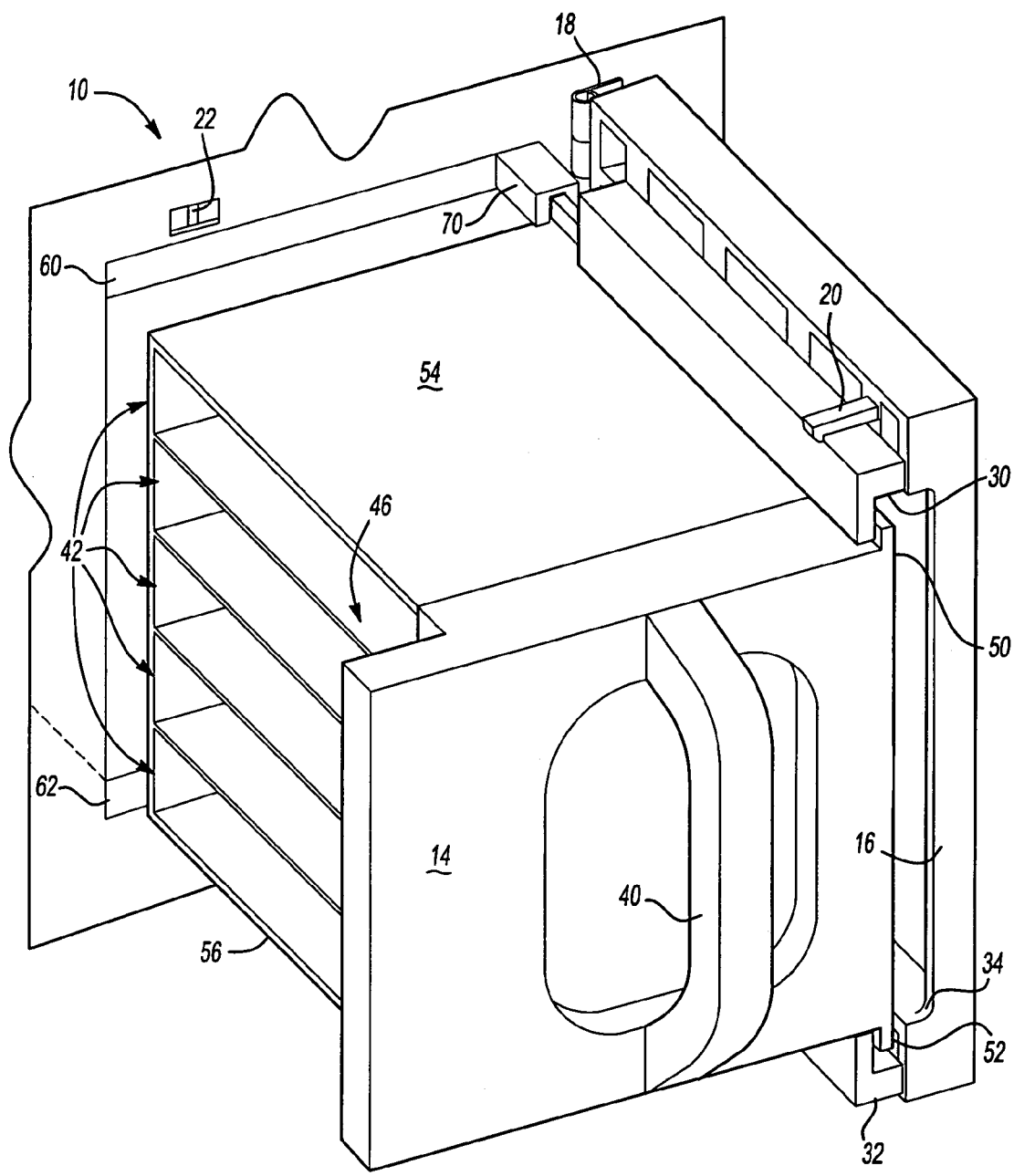
FIG. 3 is a perspective view of the portion of the data storage library with the storage container removed from storage compartment and supported by a door.
Figure 5:
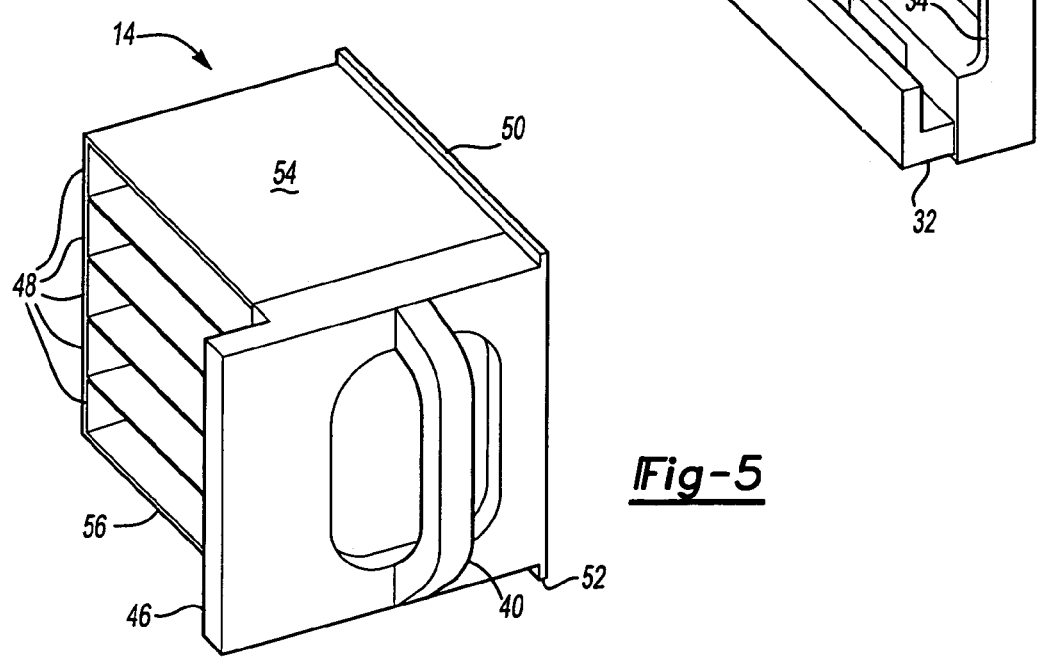
FIG. 5 is a perspective view of the storage container.

Referring to FIGS. 3 and 5, the storage container 14 is shown in more detail. The storage container 14 may be made of any suitable material(s), such as metal or a polymeric material. The storage container 14 includes a handle 40, a plurality of media ports 42, and at least one retention feature. Optionally, the storage container 14 may include a flange 46 adapted to contact the storage library 10 and inhibit movement of the storage container 14 when the storage container 14 is inserted into the storage compartment 12.

The media ports 42 are configured to receive any suitable type or combination of data storage media, such as discs or cartridges. In the embodiment shown, each media port 42 includes an opening 48 positioned on a surface opposite the door 16. However, the openings 48 may be positioned on any suitable surface or combination of storage container surfaces.

The retention feature is adapted to engage the mating feature on the door 16. In one embodiment, the storage container 14 includes a first retention feature 50 and a second retention feature 52. The retention feature(s) may be made of any suitable material and may have any suitable configuration that is compatible with the associated mating feature(s) on the door 16. For example, the retention features 50,52 may have a male configuration, a female configuration, or any combination thereof. In the embodiment shown, the retention features 50,52 have a male configuration. More specifically, the first and second retention features 50,52 are configured as parallel protrusions disposed on top 54 and bottom 56 surfaces of the storage container 14, respectively. The retention features 50,52 may have similar geometries, lengths, and may be disposed in a common plane. Alternatively, the retention features may have different geometries, lengths, and/or may be disposed in different planes. For instance, the first retention feature 50 may be a localized protrusion like a boss or knob while the second retention feature 52 may be a rail or elongated protrusion that extends across at least a portion of the bottom surface 56. The opposite configuration may be employed in which the first retention feature 50 is an elongated protrusion while the second retention feature 52 is localized.

The retention features 50,52 may be integrally formed with the storage container 14. Alternatively, the retention features 50,52 may be separate components that are attached to the storage container 14 in any suitable manner, such as by welding, fasteners, and/or adhesives.

Referring to FIG. 3, the storage container 14 is shown supported on the door 16 of the storage library 10. More specifically, the door 16 is in the open position, the storage container 14 is removed from the storage compartment 12, and the first and second mating features 30,32 are engaged with the first and second retention features 50,52, respectively. In the embodiment shown, the storage container 14 is configured slide out of the storage compartment 12 to engage the door 16.

Figure 4:
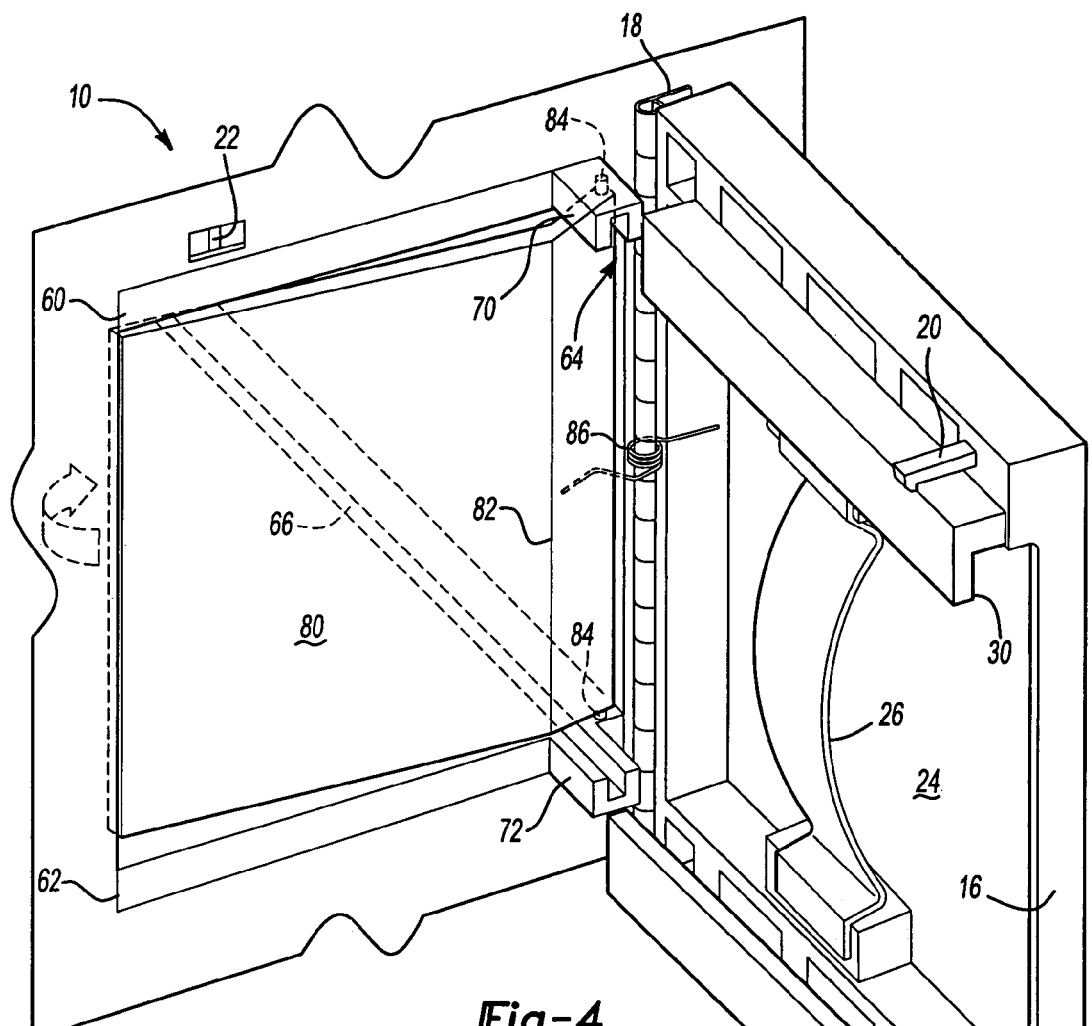
FIG. 4 is a perspective view of the portion of the data storage library without the storage container.

Referring to FIG. 4, the storage library 10 is shown with the door 16 in the open position and the storage container 14 removed, revealing the storage compartment 12. The storage compartment 12 may have a first panel 60 and a second panel 62. In one embodiment, the first panel 60 comprises the top of the storage compartment 12 and the second panel 62 comprises the bottom of the storage compartment 12.

The first and second panels 60,62 may include first and second guides 64,66, respectively. The first and second guides 64,66 may be configured to engage the first and second retaining features 50,52, respectively, when the storage container 14 is at least partially disposed in the storage compartment 12. The first and second guides 64,66 may have any suitable configuration that is compatible with the associated retaining feature on the storage container 14. For example, the guides 64,66 may have a male configuration, a female configuration, or any combination thereof. In the embodiment shown, the first and second guides 64,66 have a female configuration. More specifically, the first and second guides 64,66 are configured as parallel, coplanar grooves that extend along the first and second panels 60,62. However, the guides 64,66 may have different geometries, lengths, and/or may be disposed in different planes. Optionally, the first and second guides 64,66 and/or first and second retention features 50,52 may be supplemented, modified, or replaced with a mechanical attachment mechanism, such as a hook, magnet, or hook-and-loop type fastener like Velcro® to help secure the storage container 14.

The first and/or second panels 60,62 may include an extension arm that extends from the storage library 10. In the embodiment shown in FIG. 4, the first panel 60 includes a first extension arm 70 and the second panel 62 includes a second extension arm 72.

The first and second extension arms 70,72 may extend the first and second guides 64,66 proximate the first and second mating features 30,32 when the door is in the open position. In addition, the door 16 may be pivotally attached to the first and second extension arms 70,72.

The first and second extension arms 70,72 may be integrally formed with the first and second panels 60,62. Alternatively, the first and second extension arms 70,72 may be separate components that are attached to the storage library 10 or the first and second panels 60,62 in any suitable manner, such as with fasteners, welding, and/or adhesives.

Optionally, the storage library 10 may include an inner door 80. The inner door 80 may be configured to at least partially conceal the storage compartment 12 when the storage container 14 is removed. More specifically, the inner door 80 may move between a first position in which the inner door 80 at least partially conceals the storage compartment 12 and a second position in which the inner door 80 does not conceal the storage compartment 12.

The inner door 80 may be made of any suitable material, such as metal or a polymeric material, and may have any suitable configuration. In one embodiment, the inner door 80 includes a bend 82 configured to provide a suitable moment arm for actuating the inner door 80 toward the second position when the storage container 14 is inserted into the storage compartment 12.

The inner door 80 may be disposed on the storage library 10 in any suitable manner. For example, the inner door 80 may be movably connected to the storage library 10 by one or more hinge pins 84. For example, the inner door 80 may be pivotally attached to the first and/or second panels 60,62 or the first and second extension arms 70,72. The inner door 80 may also include a spring 86 that biases the inner door 80 toward the first position to at least partially conceal the storage compartment 12. The spring 86 may be disposed in any suitable position, such as around the hinge pin 84.

The support of the storage container 14 on the door 16 simplifies loading and unloading of the media ports 42. More specifically, data storage media may be inserted and/or removed from the media ports 42 without removing the storage container 14 from the storage library 10. Eliminating removal of the storage container 14 from the storage library 10 reduces space requirements. For example, no space is required for a secondary surface, such as a counter, that supports the storage container 14 while the storage media is exchanged. In addition, ergonomics are improved since storage media may be loaded and unloaded with one hand without the need to support the storage container with another hand. Moreover, loading and unloading time is reduced since two hands may be used to load and unload storage media and transportation of the storage container 14 is eliminated. Furthermore, heavy storage containers do not need to be carried or supported by technicians.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for supporting a storage container upon removal from a storage compartment, the storage container having a retention feature, the apparatus comprising:
   a door disposed proximate the storage compartment and being movable between an open position and a closed position, the door having a mating feature configured to engage the retention feature and to support the storage container when the door is in the open position and the storage container is removed from the storage compartment; and
   a spring configured to bias the storage container against an interior surface of the storage compartment when the door is in the closed position;
   wherein the mating and retention features are disengaged when the door is in the closed position.

2. The apparatus of claim 1 further comprising a second door configured to close behind the storage container when the storage container is removed from the storage compartment.

3. The apparatus of claim 1 wherein the retention feature is permitted to slide along the mating feature when the door is in the open position.

4. The apparatus of claim 1 wherein the retention and mating features are disposed in a plane when the door is in the open position.

5. The apparatus of claim 1 wherein the retention feature comprises a protrusion that extends along an exterior surface of the storage container.

6. The apparatus of claim 1 wherein the mating feature comprises a groove that extends along the door.

7. The apparatus of claim 1 wherein the storage compartment further has a guide adapted to receive the retention feature when the storage container is disposed in the storage compartment.

8. The apparatus of claim 7 wherein the guide is coplanar with the mating feature when the door is in the open position.

9. A data storage library for use with a storage magazine, the data storage library comprising:
   a housing that defines a storage compartment for receiving the storage magazine, the housing including first and second panels disposed proximate the storage compartment that further include first and second guides, respectively;

a door associated with the housing and being moveable between a closed position and an open position, the door including first and second mating features that are engageable with the storage magazine and configured to support the storage magazine when the door is in the open position and the storage magazine is removed from the storage compartment and do not support the storage magazine when the door is in the closed position; and wherein the first and second panels further have first and second extension arms, that extend from the data storage library, the first and second extension arms being configured to extend the first and second guides proximate the first and second mating features when the door is in the open position.

10. The apparatus of claim 9 further comprising a second door configured to close behind the storage magazine when the storage magazine is removed from the storage compartment.

11. The apparatus of claim 9 wherein the first and second mating features are coextensive with the first and second guides when the door is in the open position.

12. The apparatus of claim 9 further comprising a spring configured to bias the storage magazine against an interior surface of the storage compartment when the door is in the closed position.

13. The apparatus of claim 9 wherein the first and second extension arms are integrally formed with the first and second panels.

14. A data storage system comprising:

a media storage magazine including top and bottom surfaces, a top retention feature extending from the top surface, a bottom retention feature extending from the bottom surface, and a media port; and a data storage library including a housing having a storage compartment configured to receive the media storage magazine, the library further including a door associated with the housing and being moveable between an open position and a closed position in which the door at least partially covers the storage compartment, the door including upper and lower mating features that are engageable with the top and bottom retention features, respectively, when the door is in the open position and not engagable when the door is in the closed position and the media storage magazine is received by the storage compartment;

wherein the media storage magazine is positionable on the door to permit access to the media port when the door is in the open position.

15. The apparatus of claim 14 wherein top and bottom retention features are adapted to slide along the upper and lower mating features when the door is in the open position.

16. The apparatus of claim 14 further comprising a retention spring disposed between the upper and lower mating features for holding the media storage magazine stationary when the door is closed.

17. The apparatus of claim 14 further comprising a second door disposed in the storage compartment that at least partially conceals a storage compartment opening when the media storage magazine is removed from the storage compartment.

18. The apparatus of claim 14 wherein the top and bottom retention features are coplanar.

19. The apparatus of claim 14 wherein the upper and lower mating features are coplanar.

20. The apparatus of claim 14 wherein the door is pivotally attached to the data storage library.

* * * * *